C. J. GREENSTREET.
METHOD OF SEPARATING BARYTES FROM ORES.
APPLICATION FILED JAN. 15, 1914.
Reissued May 26, 1914.
13,735.
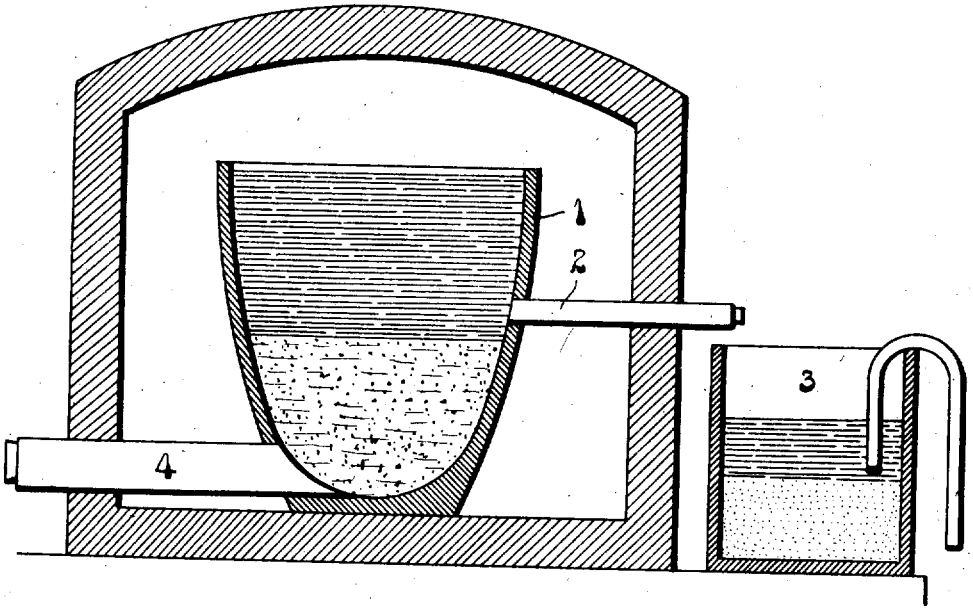
Attest
A. J. McCauley
E. B. Kenny
Inventor:
C. J. Greenstreet
by Kerr & Cook
Attys.

UNITED STATES PATENT OFFICE.

CHARLES JASON GREENSTREET, OF WEBSTER GROVES, MISSOURI.

METHOD OF SEPARATING BARYTES FROM ORES.

13,735. Specification of Reissued Letters Patent. Reissued May 26, 1914.

Original No. 1,069,545, dated August 5, 1913, Serial No. 737,777. Application for reissue filed January 15, 1914. Serial No. 812,198.

*To all whom it may concern:*

Be it known that I, CHARLES J. GREENSTREET, a citizen of the United States of America, and a resident of Webster Groves, in the county of St. Louis and State of Missouri, have invented certain new and useful Improvements in Methods of Separating Barytes from Ores, of which the following is a full, clear, and exact description, reference being had to the accompanying drawing, forming a part of this specification.

My invention relates to a method of separating non-metallic minerals, for example, barytes from zinc and other ores found natively combined with each other.

There are large deposits of zinc and barytes ores present in different sections of the United States, and particularly in western Missouri, which never have been developed for the reason that no practicable method for separating zinc and barytes ores has heretofore been discovered, it being a fact well known to those familiar with the art that it is impossible to separate ores of this kind by mechanical means, such as jigs, or tables, due to the specific gravity of zinc ores and barytes being substantially the same. It is also a well known fact that, while it is possible to effect a separation of the ores by chemical action, all of the methods heretofore proposed for so separating the ores have been such as to involve too much expense to be practicable from a commercial standpoint.

The object of my invention is to provide a method that is practicable from a commercial standpoint, by which the zinc and barytes ores may be effectually separated.

In carrying out my method, I make use of a suitable salt; for example, sodium chlorid, sodium sulfate, or the bisulfate of sodium where only the sulfid of zinc is present. The salt or a combination of salts is mixed or combined with the ores to be separated, after which the ores and salt are heated in a suitable vessel to a temperature sufficiently high to render the salt molten. By so doing, I cause the barytes to separate from the zinc ores, whether zinc sulfid, zinc carbonate, or zinc silicate, and enter into the molten salt in flotation, thus leaving the zinc ore free, or practically free, of barytes. The barytes is separated from the zinc ores in a finely divided state in the salt or salts and such separation is occasioned by the molten salt or salts acting to disintegrate or dissolve the barytes out of the zinc ores. This separation is effected purely as a physical action, and not as a chemical reaction; consequently, the chemical constitution of the barytes as well as the zinc ore is not changed. Inasmuch as the barytes is separated in a finely divided state, it enters readily into the molten salt in flotation and suspension therein; and remains thus until the molten salt and barytes have been withdrawn from the vessel in which the separation of the barytes is accomplished. The molten salt, with the barytes suspended therein, is withdrawn from the vessel containing the mixture, leaving the zinc ore, the barytes is precipitated from the molten salt by any desired procedure, such, for instance, as that hereinafter mentioned, and the latter is removed in a suitable manner, thus giving the desired freed barytes.

While any suitable step for precipitation of the barytes from the molten salt may be followed, I preferably accomplish such precipitation by delivering the molten salt and the barytes suspended therein into a settling tank containing a quantity of water.

The accompanying drawing is a section of an apparatus in which my method may be carried out.

In practising my method, I first crush the zinc and barytes ore to break them up to any degree that may be found desirable or take barytes concentrates direct and mix therewith a suitable amount of salt or salts, the quantity of salt or salts used being preferably about double the proportion of barytes in the ores. The ores and salt, having been thoroughly mixed, are then placed in a suitable crucible, or other vessel, such as that indicated by the numeral 1 in the accompanying drawing, located in a furnace of any suitable construction, to which heat may be applied in any desired manner. The heat supplied is sufficient to raise the temperature of the mixture in the vessel 1 to the melting point of the salt in the mixture, care being taken to avoid a temperature sufficiently great to cause volatilization of the salt. The mixture being heated to the temperature specified, the barytes is dissolved and separated from the zinc ore and rises with the molten salt to the top of the mass in the vessel 1, where it becomes suspended in the molten salt, while the zinc ore, freed of barytes, settles to the bottom of the mass. The molten salt and barytes may then be drawn off from the top of the mass through the pipe 2, normally closed, the molten salt and barytes being preferably delivered into a settling tank 3, partially filled with water. The insoluble barytes settles in this tank as a precipitate, and the salt solution is thereafter withdrawn from the tank. The zinc ore may be removed from the vessel 1 after the salt and barytes have been withdrawn therefrom, and to permit such removal, I connect to the crucible a lower pipe 4 that is normally closed by suitable means, through which the zinc ore may be extracted.

It should be mentioned that the salt used in carrying out my method may be recovered by evaporation of the water from the salt and water solution and be used over and over, after it has been withdrawn from the settling tank in which precipitation of the barytes occurs.

I would add that it is possible to carry out my method in a slightly modified way, to-wit, by applying flame or radiated or reflected heat directly to the ores and salt combined with them. In so doing, the mixture may be placed on the floor of a furnace, and direct flame, or reflected heat, applied to the mass. In practising a method of this modified description, the salt becomes molten, and the molten salt and barytes sink through the mass of material to a lower position, while the zinc ore will become present as a porous mass above the salt and barytes.

It will be perceived that in carrying out my method first described, the molten salt and barytes suspended therein become present at the top of the mass under treatment; while, when the modified method is followed, they become present at the bottom of the mass, and in view of the fact that there may be seeming conflict between the statements of the different results in following the different methods, I desire to make the following statement: When the first described method is followed, the mass of zinc ore and barytes with a salt or salts combined therewith are evenly heated throughout while in a suitable vessel, due to the heat being applied at the bottom or sides of the vessel; and, as a result, the molten salt and barytes that become suspended therein rise to the surface of the mass; or otherwise expressed, the zinc ore settles at the bottom of the vessel with consequent displacement of the molten salt and barytes to the upper level of the mass. When, on the contrary, heat is applied only to the surface of the mass of material undergoing treatment, the top portion of the mass receives the heat, while the lower portion of the mass remains at the lower temperature; and, as consequence, the salt, upon becoming molten, sinks or settles through the body of the mass of material during the separation of barytes from the zinc ore.

In the foregoing description I have set forth my method as utilized for separating barytes from zinc ores, and while I have so described my improvement I wish it understood that I am cognizant that barytes may be separated by my method from metallic ores, other than zinc ores, I having found, by experiment, that my method may be successfully used in treating the following: lead and barytes ores, lead, zinc and barytes ores, and lead, zinc and barytes ores carrying copper. I therefore claim protection for my method when utilized for separating barytes from ores of all kinds from which it may be separated by following my method.

While I have herein specified the use of a salt or salts as the medium for dissolving barytes to permit separation thereof from ores in practising my method, I wish it understood that I do not thereby limit myself to the use of a salt, but claim protection for the method, when practised with the use of any equivalent for a salt as herein contemplated.

Believing it to be new with me to separate a non-metallic mineral, for example, barytes, from metallic ores in general, from which a non-metallic mineral may be separated by following the essential steps of my method, I wish it understood that I do not limit myself to the exact steps of the method carried out in accordance with the description first given, or in accordance with the modification I have set forth, but claim my method broadly when practised by following any steps that involve, placing with the ore to be treated a chemical agent capable of dissolving the non-metallic mineral when heated, and heating the ore and chemical agent to a sufficient degree to dissolve the non-metallic mineral and permit its separation from the metallic ore. In this connection, I wish to mention another modification of my method. The steps of this modification involve placing with the ore to be treated, the chemical agent capable of dissolving the non-metallic mineral present with the ore, then heating the chemical agent to a degree to provide for the non-metallic mineral being dissolved by such chemical agent, and, as a succeeding step, washing the non-metallic mineral from the non-metallic ore in any suitable manner, this modification differing from both the method involving flotation, or the first modification in the practice of which the dissolved mineral settles out of the metallic ore.

For clearness of description, I wish to state that the words "dissolve" and "dissolved", as used herein, are used with the intention that they will be understood to mean the separation into a fluid medium of particles of a solid body without reducing said particles to a liquid state.

It is to be understood that although I have described my method as practised in separating a specific non-metallic mineral from a metallic and non-metallic ore, I do not limit myself to the use of my method for the separation of this particular non-metallic mineral, but claim its use generally for the separation of non-metallic minerals, such as barytes, from metallic and non-metallic ores.

I claim:—

1. The method of separating a non-metallic mineral, such as barytes from a metallic and non-metallic ore, which consists in placing with the ore a chemical agent capable of dissolving the mineral when heated, heating the ore and chemical agent to a sufficient degree to dissolve the mineral, and removing the mineral from the metallic ore.

2. The method of separating a non-metallic mineral, such as barytes from a metallic and non-metallic ore, which consists in placing with the ore a chemical agent capable when heated of dissolving the mineral without changing its chemical constitution, heating the ore and chemical agent to a sufficient degree to dissolve the mineral, and removing the mineral from the metallic ore.

3. The method of separating a non-metallic mineral, such as barytes from a metallic and non-metallic ore, which consists in placing with the ore a chemical agent capable of dissolving the mineral when heated, heating the ore and chemical agent to a sufficient degree to dissolve the mineral, removing the mixture of mineral and chemical agent from the metallic ore, and thereafter separating the mineral and said chemical agent.

4. The method of separating barytes from metallic and barytes ore, which consists in placing with the ore a chemical agent capable of dissolving barytes when heated, heating the ore and chemical agent to a sufficient degree to dissolve the barytes, and removing the barytes from the metallic ore.

5. The method of separating barytes from metallic and barytes ore, which consists in placing with the ore a chemical agent capable of dissolving barytes when heated, heating the ore and chemical agent to a sufficient degree to dissolve the barytes, removing the mixture of barytes and chemical agent from the metallic ore, and thereafter separating the barytes and said chemical agent.

6. The method of separating barytes from metallic and barytes ore, which consists in placing with the ore a salt capable of dissolving barytes when heated to the melting point of the salt, heating the ore and salt to a sufficient degree to melt the salt and dissolve the barytes, and removing the barytes from the metallic ore.

7. The method of separating barytes from metallic and barytes ore, which consists in placing with the ore a salt capable of dissolving barytes when heated to the melting point of the salt, heating the ore and salt to a sufficient degree to melt the salt and dissolve the barytes, removing the mixture of barytes and salt from the metallic ore, and thereafter separating the barytes and salt.

8. The method of separating barytes from metallic and barytes ore, which consists in placing chlorid of sodium with the ore, heating the ore and chlorid of sodium to a sufficient degree to melt the chlorid of sodium and dissolve the barytes, and removing the barytes from the metallic ore.

9. The method of separating barytes from metallic and barytes ore, which consists in placing chlorid of sodium with the ore, heating the ore and chlorid of sodium to a sufficient degree to melt the chlorid of sodium and dissolve the barytes, removing the mixture of barytes and chlorid of sodium from the metallic ore, and thereafter separating the barytes and said chlorid of sodium.

10. The method of separating barytes from zinc and barytes ore, which consists in placing with the ore a chemical agent capable of dissolving barytes when heated, heating the ore and chemical agent to a sufficient degree to dissolve the barytes, and removing the barytes from the zinc ore.

11. The method of separating barytes from zinc and barytes ore, which consists in placing with the ore a chemical agent capable of dissolving barytes when heated, heating the ore and chemical agent to a sufficient degree to dissolve the barytes, removing the mixture of barytes and chemical agent from the zinc ore, and thereafter separating the barytes and said chemical agent.

12. The method of separating barytes from zinc and barytes ore, which consists in placing with the ore a salt capable of dissolving barytes when heated to the melting point of the salt, heating the ore and salt to a sufficient degree to melt the salt and dissolve the barytes, and removing the barytes from the zinc ore.

13. The method of separating barytes from zinc and barytes ore, which consists in placing with the ore a salt capable of dissolving barytes when heated to the melting point of the salt, heating the ore and salt to a sufficient degree to melt the salt and dissolve the barytes, removing the mixture of barytes and salt from the zinc ore, and thereafter separating the barytes and the salt.

14. The method of separating barytes from zinc and barytes ore, which consists in placing chlorid of sodium with the ore, heating the ore and chlorid of sodium to a sufficient degree to melt the chlorid of sodium and dissolve the barytes, and removing the barytes from the zinc.

15. The method of separating barytes from zinc and barytes ore, which consists in placing chlorid of sodium with the ore, heating the ore and chlorid of sodium to a sufficient degree to melt the chlorid of sodium and dissolve the barytes, removing the mixture of barytes and chlorid of sodium from the zinc ore, and thereafter separating the barytes and chlorid of sodium.

CHARLES JASON GREENSTREET

In the presence of—

E. K. CLARK,

E. B. LINN.